United States Patent [19]

Nakamura

[11] Patent Number: 4,747,604
[45] Date of Patent: May 31, 1988

[54] ROTARY SHAFT SEAL FOR DRILL BIT CUTTERS

[75] Inventor: Osamu Nakamura, Tokyo, Japan

[73] Assignee: Tsukamoto Seiki Co., Ltd., Tokyo, Japan

[21] Appl. No.: 909,113

[22] Filed: Sep. 18, 1986

[30] Foreign Application Priority Data

Jun. 13, 1986 [JP] Japan ................................. 61-137888

[51] Int. Cl.⁴ ............................................. F16J 15/34
[52] U.S. Cl. ........................................ 277/83; 277/92; 277/95; 277/170; 277/177
[58] Field of Search ...................... 277/83, 84, 92, 95, 277/165, 177, 186, 168, 170, 171

[56] References Cited

U.S. PATENT DOCUMENTS 3,339,928  9/1967  Wolthausen .
3,529,840  9/1970  Durham et al. ................. 277/170 X
3,761,145  9/1973  Schumacher, Jr. .
4,176,848  12/1979  Lafuze .
4,344,629  8/1982  Oelke ................................. 277/95 X
4,372,624  2/1983  Neilson ............................ 277/168 X
4,516,641  5/1985  Burr .

Primary Examiner—Robert S. Ward
Attorney, Agent, or Firm—Wenderoth, Lind & Ponack

[57] ABSTRACT

A rotary shaft seal for the rotary cutter of a each boring drill bit includes a fixed seal ring fitted securely in the cutter and having an end face which includes a first tapered surface, a floating seal ring having an end face, which includes a second tapered surface opposing the first tapered surface, and a curved inner circumferential surface, and a resilient O-ring compressed between the curved inner circumferential surface of the floating ring and a bearing portion on which the cutter is rotatably journalled.

5 Claims, 3 Drawing Sheets

ROTARY SHAFT SEAL FOR DRILL BIT CUTTERS

BACKGROUND OF THE INVENTION

1. Field of the Invention

This invention relates to a rotary shaft seal for the cutter portion of a drill bit used to bore wells such as petroleum and geothermal wells in the earth.

2. Description of the Prior Art

Systems for providing a seal between the rotary cone cutter and bearing pin of a drill bit include O-ring configurations such as disclosed in the specification of U.S. Pat. No. 3,339,928 and metal face seals as described in the specifications of U.S. Pat. Nos. 3,761,145, 4,176,848 and 4,516,641.

There is growing demand for drill bits used in boring petroleum, geothermal and other wells that can operate under the high temperatures and pressures encountered when drilling through hard rock formations at great depth. For this reason, the development of wear- and heat-resistant sealing means for the rotary cutter portion of such drill bits has been eagerly awaited. An O-ring made of heat-resistant resilient rubber may be employed as such sealing means and provides a good seal by virtue of the relative motion between the O-ring and the cutter or between the O-ring and the bearing portion. However, since the O-ring continuously sustains the repeated impact that accompanies such relative motion while also being subjected to high temperatures, deterioration of the resilient rubber constituting the O-ring is accelerated and, as a result, rapid destruction of the seal at the rotating portion of the drill is unavoidable.

In an effort to solve the problem of the O-ring seal caused by such deterioration of the resilient rubber, a sealing mechanism capable of withstanding the conical movement of the cutter has been fabricated in which a heat- and wear-resistant metal seal of high hardness is used at the rotary seal portion and is supported by a seal made of a heat-resistant resilient rubber. This latter mechanism is the metal face seal referred to above. The metal face seal arrangement is composed of a comparatively large number of component parts that, when assembled, result in a seal structure of some complexity. In addition, because of the dragging or scoring that occurs between the hard metal components and due to the combination of the hard metal material with the soft natural rubber, an excellent sealing property cannot be maintained over a very long period of time.

SUMMARY OF THE INVENTION

An object of the present invention is to provide a rotary shaft seal having a long service life and a simple structure by simultaneously solving the problems encountered in the rotary sealing structures of the two types mentioned above.

According to the present invention, the foregoing object is attained by providing a rotary shaft seal for a cutter of a drill bit having a bit body formed to include a bearing portion on which the cutter is rotatably journalled, the seal comprising a fixed seal ring fitted securely in the cutter and having an end face which includes a first tapered surface, a floating seal ring having an end face, which includes a second tapered surface opposing the first tapered surface, and a curved inner circumferential surface, and a resilient O-ring compressed between the curved inner circumferential surface of the floating ring and the bearing portion.

Owing to the severe conditions under which the drill bit is used, it is required that the fixed seal ring and floating seal ring be made of a metal material which is both heat- and wear-resistant, and that the resilient O-ring consist of a heat-resistant rubber material. If the fixed seal ring and floating seal ring exhibit a difference in hardness between the surface layer and interior, this will markedly promote their deformation under high temperatures and pressures. Therefore, based on the fact that a suitable metal material should not require a surface treatment such as carburizing or nitriding, and that a material with a high carbon content is preferred in order to enhance wear resistance, a characterizing feature of the present invention is that the fixed seal ring and floating seal ring comprise a white pig iron-type cast iron.

In the seal arrangement described above, the fixed seal ring and floating seal ring constitute a pair of metal face seals. The first seal ring is secured in the cutter as by shrinkage fitting, and the floating seal ring is supported on the O-ring, which is made of the resilient rubber material. Consequently, the floating seal ring is biased into pressured contact with the fixed seal ring by the elastic force of the O-ring. The floating seal ring and fixed seal ring are each formed to include the tapered surfaces on the radially inward sides of their opposing end faces. The portions of these seal rings that are in pressured contact are flat surfaces partially constituting the opposing end faces at their radially outward sides. Thus, a radially extending wedge-shaped gap is formed between the tapered surfaces. The gap serves as a small lubricant reservoir for smoothly and constantly supplying the flat end faces of the seal rings that are in pressured contact with a lubricant while the cutter is undergoing conical movement. Thus, during conical movement of the cutter, non-uniform deformation of the floating seal ring is absorbed by the O-ring owing to its resilience so that the floating seal ring will always follow up the fixed seal ring with excellent response. This assures that the metal face seals of the two seal rings where the flat surfaces thereof are in pressured contact will be stably maintained over an extended period of time.

When the internal pressure of the lubricant within the bit surpasses the external pressure, namely the fluidic pressure in the bore hole, during the conical movement of the cutter, the lubricant is allowed to leak from the seal. When the external pressure exceeds the internal pressure, the flat surface portion of the floating seal ring is pressed against the flat surface portion of the fixed seal ring more strongly to enhance the seal at these portions so that cuttings and other detritus are prevented from penetrating the interior of the cutter seal.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
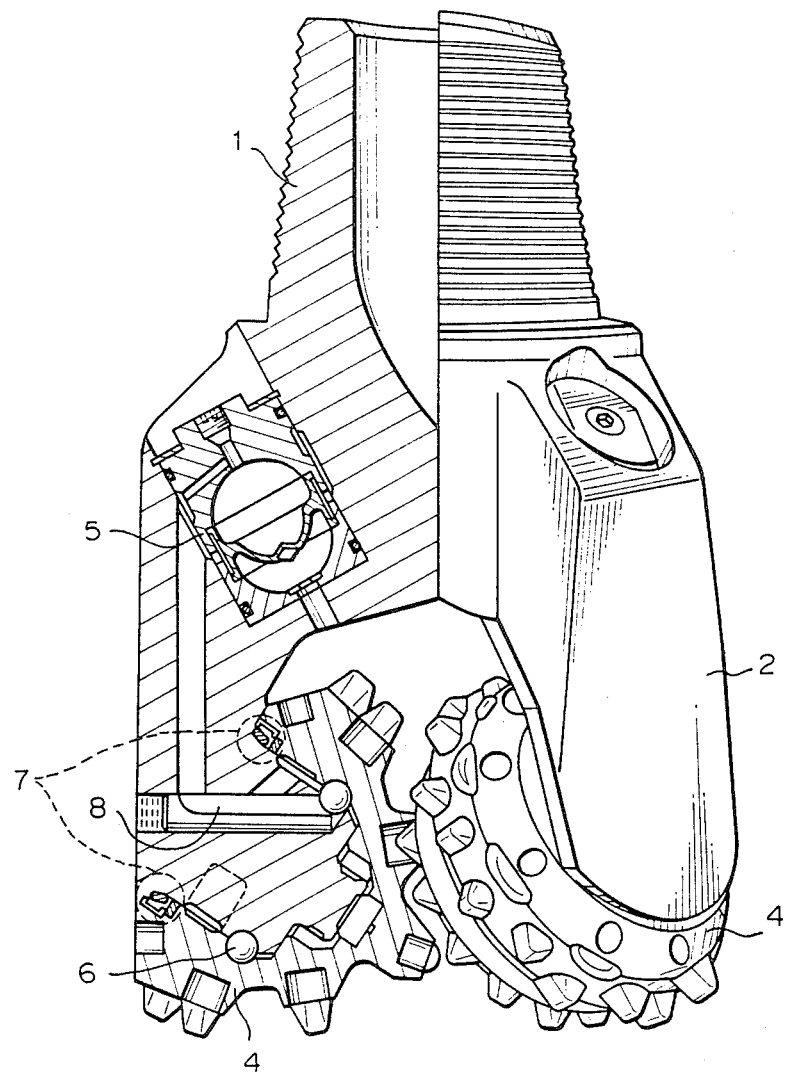
FIG. 2 is a side elevational view, partially in section, illustrating a portion of a drill bit incorporating the seal of FIG. 1.

A drill bit incorporating a rotary shaft seal arrangement in accordance with the present invention is illustrated in FIG. 2. The drill bit has a bit body 1 having a threaded shank at its upper portion and three downwardly extending bit legs 2. A rotary cutter 4 is supported for rotation via a ball bearing 6 on a support shaft fixedly secured to the distal end of each bit leg 2. Extending into the support shaft is a lubricating passageway 8 communicating with a pressure compensator 5 accommodated within the bit body 1 and filled with a lubricant such as grease. The lubricant is supplied to a rotary shaft seal arrangement 7 at the base of the support shaft through a cutter lubricant reservoir located at the terminus of the passageway 8.

Figure 1:
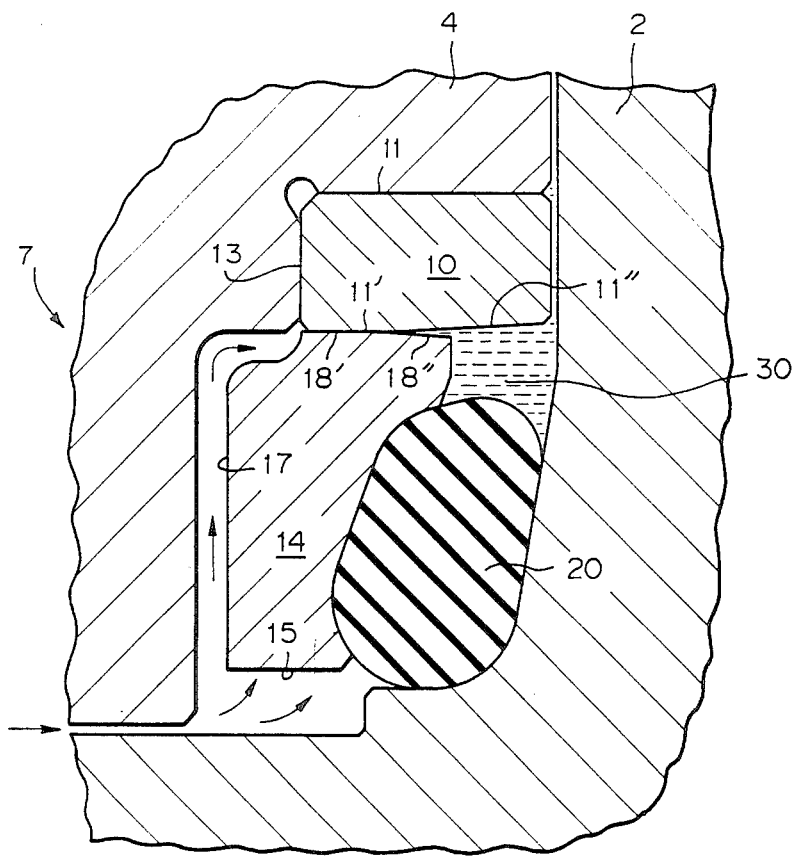
FIG. 1 is a fragmentary enlarged sectional view illustrating a preferred embodiment of a rotary shaft seal at the cutter portion of a drill bit according to the present invention.

As shown in FIGS. 1 and 3, the seal arrangement 7 in accordance with the invention includes three sealing elements, namely a fixed seal ring 10 embraced by the rotary cutter 4 and the support shaft constituting a portion of the bit leg 2, a floating seal ring 14 having a curved inner surface, and a resilient O-ring 20. The fixed seal ring 10 has an upper surface 11 and an outer circumferential surface 13 and is shrinkage-fit into place between the cutter 4 and support shaft in such a manner that its surfaces 11, 13 abut against an annular step formed in the cutter 4. The resilient O-ring 20 is inserted into the base portion of the support shaft and supports the floating seal ring 14, whose inner surface is so curved as to distort and grip the O-ring 20. The surface of the fixed seal ring 10 that opposes the floating seal ring 14 comprises a flat surface 11′ and a tapered surface 11″. The surface of the floating seal ring 14 that opposes the fixed seal ring 10 comprises a flat surface 18′ and a tapered surface 18″. The flat surfaces 11′, 18′ are biased into pressured contact by the elastic force of the resilient O-ring 20 and constitute metal face seals. Grease 30 within the bit is supplied to the metal face seal portion at the end of a wedge-shaped gap formed between the tapered surfaces 11″, 18″, and to a portion between the floating seal ring 14 and O-ring 20 and between the O-ring 20 and base portion of the support shaft. Formation cuttings and mud from outside the bit reach the seal arrangement by flowing in the direction of the arrows when the cutter is rotated and press the floating seal ring 14 against the fixed seal ring 10. The opposing flat surfaces 11′, 18′ of these seal rings forming the metal face seals provide a surface which seals out the mud and other detritus when the cutter rotates.

Figure 3B:
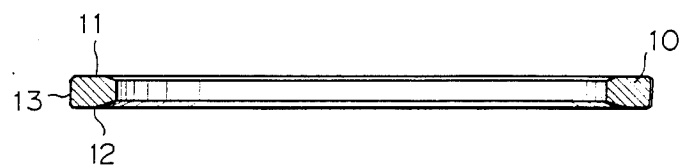
FIGS. 3A, 3B and 3C are longitudinal sectional views respectively illustrating a floating seal ring, fixed seal ring and resilient O-ring used in the seal of FIG. 1.
Figure 3A:
Figure 3C:
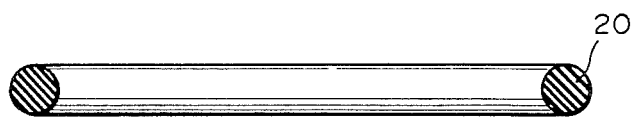

An embodiment of the seal elements constituting the rotary shaft seal arrangement 7 are illustrated in the sectional views of FIGS. 3A, 3B and 3C. The fixed seal ring 10, shown in FIG. 3B, has the upper surface 11, the outer circumferential surface 13 and a bottom surface 12 which, as mentioned above, includes the flat surface 11′ and the tapered surface 11″, the latter being tapered in the radial direction. The floating seal ring 14, depicted in FIG. 3A, has an upper surface 18 that includes flat surface 18′ and tapered surface 18″ mentioned above, the latter likewise being tapered in the radial direction. The seal ring 14 also includes an outer circumferential surface 17 which is flat. The outer circumferential shoulder at the upper surface 18 of floating seal ring 14 defines an annular recess 19, while the inner circumferential shoulder at the upper surface forms a radially extending annular projection 19′ that defines a curved inner circumferential surface 16. The seal ring 14 has a bottom surface 15 which is flat. The fixed seal ring 10 and floating seal ring 14 are made of a metal material exhibiting a sufficiently high wear and heat resistance, a high hardness and excellent heat treatability. Suitable examples of compositions that can be used are the white pig iron-type cast irons A and B shown below (where numerical values indicate per cent by weight):

|   | C | Si | Mn | Cr | Ni | Mo | S | P | V | Vickers Hardness Hv |
|---|---|---|---|---|---|---|---|---|---|---|
| (A) | 2.4~3.8 | 0.7~1.3 | 0.3~1.0 | 1.3~2.0 | — | 0.2 | 0.1 | 0.1 | 0.5~2.0 | 780–280 |
| (B) | 2.75~3.25 | 0.7~1.3 | 0.3~1.0 | 15~27 | — | 0.5~3.0 | 0.03 | 0.03 |  | 680–820 |

It is preferred that the surfaces of the metal seal rings be subjected to lapping machining to provide a surface roughness $R_{max}$ of 0.1 to 0.5 m.

The resilient O-ring 20, which is shown in FIG. 3C, is made of a resilient rubber, particularly a heat- and oil-resistant resilient rubber, and has a circular cross section. However, if the O-ring 20 is of a shape that affords excellent pressurized sealing action when fitted to the curved inner circumferential surface 16 of the floating seal ring 14, the cross section of the O-ring 20 need not necessarily be circular.

The rotary shaft seal for the cutter of a drill bit according to the present invention has fewer seal components and a simpler structure than the rotary shaft seal arrangement that employs conventional metal face seals. It also uses seal elements which do not require treatment for high hardness and achieves a metal face seal that follows up the conical movement of the cutter in a superior manner. The result is a drill bit durable over a period of time much longer than heretofore possible at far greater boring depths and under much harsher conditions of high temperature and pressure. The seal arrangement of the invention is capable of sufficiently extending the service life of the drill bit even when the drill is used in very deep drilling and to bore through zones of high geothermal temperature.

As many apparently widely different embodiments of the present invention can be made without departing from the spirit and scope thereof, it is to be understood that the invention is not limited to the specific embodiments thereof except as defined in the appended claims.

What we claim is:

1. A rotary shaft seal for a cutter of a drill bit having a bit body formed to include a bearing portion on which the cutter is rotatably journalled, comprising:
    a fixed seal ring fitted securely in the cutter and having an end face which includes a first tapered surface;

a floating seal ring having an end face which includes a second tapered surface opposing said first tapered surface, and a curved inner circumferential surface; and a resilient O-ring compressed between the curved inner circumferential surface of said floating ring and said bearing portion.

2. The seal according to claim 1, wherein said fixed seal ring and said floating seal ring consist of a heat- and wear-resistant metal material.

3. The seal according to claim 1, wherein said resilient O-ring consists of a heat-resistant rubber material.

4. The seal according to claim 1 or claim 2, wherein said fixed seal ring and said floating seal ring consist of a white pig iron-type cast iron.

5. The seal according to claim 2, wherein said fixed seal ring and said floating seal ring consist of a white pig iron-type cast iron.

* * * * *